US012631113B2

(12) United States Patent
Long et al.

(10) Patent No.: US 12,631,113 B2
(45) Date of Patent: May 19, 2026

(54) AEROFOIL STRUCTURE FOR A GAS TURBINE ENGINE

(71) Applicant: ROLLS-ROYCE plc, London (GB)

(72) Inventors: Kevin Long, Derby (GB); Matthew Hancock, Derby (GB); Donka Novovic, Birmingham (GB)

(73) Assignee: Rolls-Royce PLC, London (GB)

(*) Notice: Subject to any disclaimer, the term of this patent is extended or adjusted under 35 U.S.C. 154(b) by 39 days.

(21) Appl. No.: 18/926,997

(22) Filed: Oct. 25, 2024

(65) Prior Publication Data

US 2025/0250900 A1 Aug. 7, 2025

(30) Foreign Application Priority Data

Nov. 21, 2023 (GB) ..................................... 2317753

(51) Int. Cl.

*F01D 11/12* (2006.01)
*F01D 5/14* (2006.01)
*F01D 5/28* (2006.01)

(52) U.S. Cl.

CPC ............. *F01D 5/147* (2013.01); *F01D 5/288* (2013.01); *F01D 11/122* (2013.01); *F05D 2220/32* (2013.01); *F05D 2230/11* (2013.01); *F05D 2230/13* (2013.01); *F05D 2230/21* (2013.01);

(Continued)

(58) Field of Classification Search

CPC ........ F01D 5/147; F01D 5/288; F01D 11/122; F05D 2220/32; F05D 2230/11; F05D 2230/13; F05D 2230/21; F05D 2240/307; F05D 2300/611

See application file for complete search history.

(56) References Cited

U.S. PATENT DOCUMENTS

| | | | | |
|---|---|---|---|---|
| 6,171,351 | B1 * | 1/2001 | Schroder ................. | F01D 11/12 51/307 |
| 7,479,328 | B2 | 1/2009 | Roth-Fagaraseanu et al. | |
| 2005/0276688 | A1 | 12/2005 | Roth-Fagaraseanu et al. | |

(Continued)

FOREIGN PATENT DOCUMENTS

WO 2014096840 A1 6/2014

OTHER PUBLICATIONS

Great Britain search report dated Jun. 5, 2024, issued in GB Patent Application No. 2317753.8.

(Continued)

*Primary Examiner* — Aaron R Eastman

(57) ABSTRACT

An aerofoil structure for a gas turbine engine includes an aerofoil portion and a tip portion. The tip portion includes a tip surface configured to face a corresponding seal segment of the gas turbine engine and a plurality of cutting features provided on at least a portion of the tip surface. The cutting features are discrete and spaced apart from each other. The tip surface defines a longitudinal axis along a length of the tip surface and a transverse axis perpendicular to the longitudinal axis. Each cutting feature extends from the tip surface and is configured to cut into the seal segment in a cutting direction parallel to the longitudinal axis upon rotation of the aerofoil structure relative to the seal segment. A minimum longitudinal distance between a pair of adjacent cutting features from the plurality of cutting features along the longitudinal axis is at least 100 microns.

17 Claims, 8 Drawing Sheets

(52) U.S. Cl.
CPC .. *F05D 2240/307* (2013.01); *F05D 2300/611* (2013.01)

(56) References Cited

U.S. PATENT DOCUMENTS

| | | | | |
|---|---|---|---|---|
| 2008/0206542 | A1* | 8/2008 | Vance | F01D 11/122 428/304.4 |
| 2010/0150730 | A1* | 6/2010 | Sellars | F01D 11/122 29/889.7 |
| 2012/0099972 | A1* | 4/2012 | Guo | C23C 30/00 427/454 |
| 2014/0305270 | A1 | 10/2014 | Withey et al. | |
| 2015/0078900 | A1* | 3/2015 | Allen | F01D 11/122 416/174 |
| 2015/0337670 | A1 | 11/2015 | Merriman | |
| 2016/0069195 | A1* | 3/2016 | Hewitt | F01D 5/20 416/241 B |
| 2018/0087515 | A1* | 3/2018 | Sarawate | C23C 4/11 |
| 2019/0323363 | A1* | 10/2019 | Sippel | F01D 5/288 |
| 2023/0160316 | A1 | 5/2023 | Schrüfer et al. | |
| 2023/0340884 | A1* | 10/2023 | Uihlein | C23C 28/321 |

OTHER PUBLICATIONS

Luna et al, Engineered grinding tools reimplemented by precise sharpening: A case study on an ultrahard ceramic matrix composite (CMC), 10.1016/j.cirp.2022.04.011, Apr. 26, 2022, Elsevier.

Szeliga et al, Modeling of Directional Solidification of Columnar Grain Structure in CMSX-4 Nickel-Based Superalloy Castings, 10.1007/s11665-013-0820-8, Dec. 13, 2013, ResearchGate.

* cited by examiner

AEROFOIL STRUCTURE FOR A GAS TURBINE ENGINE

CROSS-REFERENCE TO RELATED APPLICATIONS

This specification is based upon and claims the benefit of priority from United Kingdom patent application number GB 2317753.8 filed on Nov. 21, 2023, the entire contents of which is incorporated herein by reference.

BACKGROUND

Technical Field

The present disclosure relates to an aerofoil structure for a gas turbine engine and a method of manufacturing the aerofoil structure.

Description of the Related Art

Blades of gas turbine engines are typically arranged with a minimum clearance between the tip surfaces of the blades and the seal segment structures associated therewith, as any gap therebetween may contribute to a reduction in efficiency. Each of the blades may include an aerofoil structure defining its geometry. The tip surfaces of such blades are often provided with an abrasive coating, and a corresponding portion of the seal segment is provided with an abradable coating. The abradable coating is removed by the tip surface if the tip surface comes into contact with the abradable coating.

Often, the abrasive coating is applied to a flat surface that is machined or otherwise formed on the tip surface. Occasionally, the flat surface, rather than an edge of the tip surface, may come into contact with the abradable coating. When the flat surface of the tip surface comes into contact with the abradable coating for an extended period of time, there is a possibility of the tip surface suffering from what is referred to as “blueing” as a result of the creation of high frictional forces which create high temperatures that are associated with oxidisation (or blueing).

Excessive “blueing” may reduce fatigue strength of the blade and may result in the blade being prematurely withdrawn from service for repair, or scrapped. Moreover, overheating may also result in the degradation of the abrasive coating located on the blade tip surface which in turn increases the gap between the blade tip and the corresponding portion of the seal segment. Consequently, blade tip leakage is increased while gas turbine engine efficiency is reduced.

SUMMARY

According to a first aspect there is provided an aerofoil structure for a gas turbine engine. The aerofoil structure includes an aerofoil portion and a tip portion. The tip portion includes a tip surface configured to face a corresponding seal segment of the gas turbine engine. The tip portion further includes a plurality of cutting features provided on at least a portion of the tip surface. The cutting features are discrete and spaced apart from each other. The tip surface defines a longitudinal axis along a length of the tip surface and a transverse axis perpendicular to the longitudinal axis. Each cutting feature from the plurality of cutting features extends from the tip surface and is configured to cut into the seal segment in a cutting direction parallel to the longitudinal axis upon rotation of the aerofoil structure relative to the seal segment. A minimum longitudinal distance between a pair of adjacent cutting features from the plurality of cutting features along the longitudinal axis is at least 100 microns.

In some embodiments, the minimum longitudinal distance is from 100 microns to 200 microns.

In some embodiments, a minimum transverse distance between a pair of adjacent cutting features from the plurality of cutting features along the transverse axis is from 80 microns to 280 microns.

In some embodiments, a pair of adjacent cutting features from the plurality of cutting features that are spaced apart from each other along the longitudinal axis define a minimum overlap between them along the transverse axis. The minimum overlap is at least 10 microns.

In some embodiments, each cutting feature defines a maximum width along the transverse axis. The maximum width is from 100 microns to 300 microns.

In some embodiments, each cutting feature defines a maximum length along the longitudinal axis. The maximum length is from 100 microns to 200 microns.

In some embodiments, each cutting feature defines a maximum height from and perpendicular to the tip surface. The maximum height is from 75 microns to 250 microns.

In some embodiments, at least two cutting features from the plurality of cutting features have different maximum heights from the tip surface.

In some embodiments, each cutting feature includes a leading surface extending from the tip surface. Each cutting feature further includes a trailing surface spaced apart from the leading surface along the longitudinal axis and extending from the tip surface. Each cutting feature further includes a top surface spaced apart from the tip surface and extending between the leading surface and the trailing surface. The leading surface and the top surface intersect at a cutting tip that is configured to first cut the seal segment in the cutting direction.

In some embodiments, a rake angle between the leading surface and a normal axis perpendicular to the tip surface is from 90 degrees to −50 degrees.

In some embodiments, a relief angle between the top surface and the longitudinal axis is from 10 degrees to 30 degrees.

In some embodiments, the plurality of cutting features is arranged in a plurality of rows extending along the transverse axis and spaced apart from each other along the longitudinal axis.

In some embodiments, adjacent rows from the plurality of rows are staggered from each other along the transverse axis.

In some embodiments, the cutting features of at least two rows from the plurality of rows are vertically offset from each other along a normal axis perpendicular to the tip surface.

In some embodiments, the aerofoil structure further includes a coating disposed on the plurality of cutting features.

In some embodiments, the coating includes a material having a higher hardness than a material of each cutting feature.

According to a second aspect there is provided a method of manufacturing the aerofoil structure of the first aspect. The method includes forming the plurality of cutting features on the tip surface by at least one of: electrical discharge machining (EDM), electro chemical machining (ECM), machining, milling, stamping, casting, mechanical blasting, chemical etching, and laser ablation.

According to a third aspect there is provided a turbine blade of a gas turbine engine. The turbine blade includes the aerofoil structure of the first aspect.

According to a fourth aspect there is provided a gas turbine engine. The gas turbine engine includes the aerofoil structure of the first aspect.

In some embodiments, the gas turbine engine further includes a seal segment including an abradable coating facing the tip surface of the aerofoil structure. Each cutting feature of the aerofoil structure is configured to cut the abradable coating.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to100 $Nkg^{-1}s$, or 85 $Nkg^{-1}s$ to 95 $Nkg^{-1}s$. Such engines may be particularly efficient in comparison with conventional gas turbine engines.

A turbine blade and/or aerofoil portion of a fan blade described and/or claimed herein may be manufactured from any suitable material or combination of materials.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
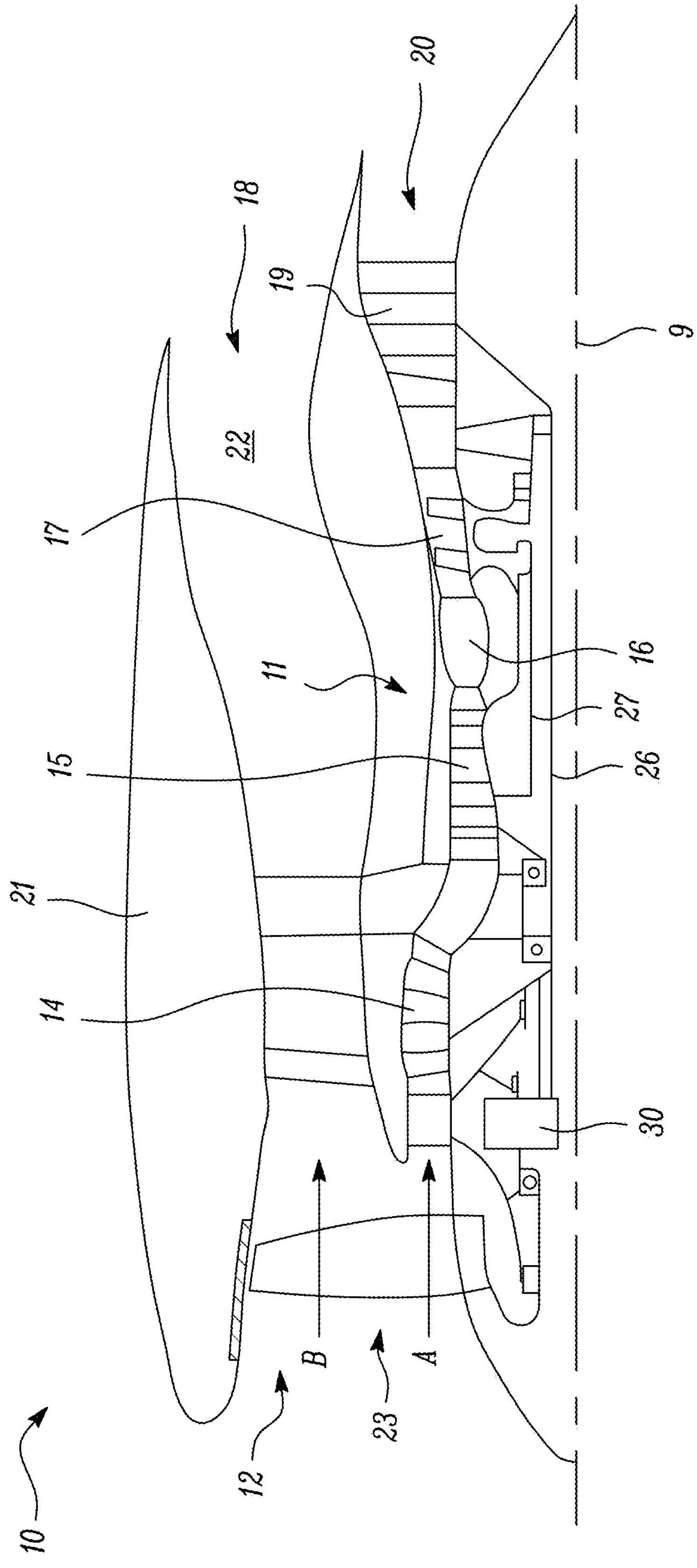
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

Figure 2:
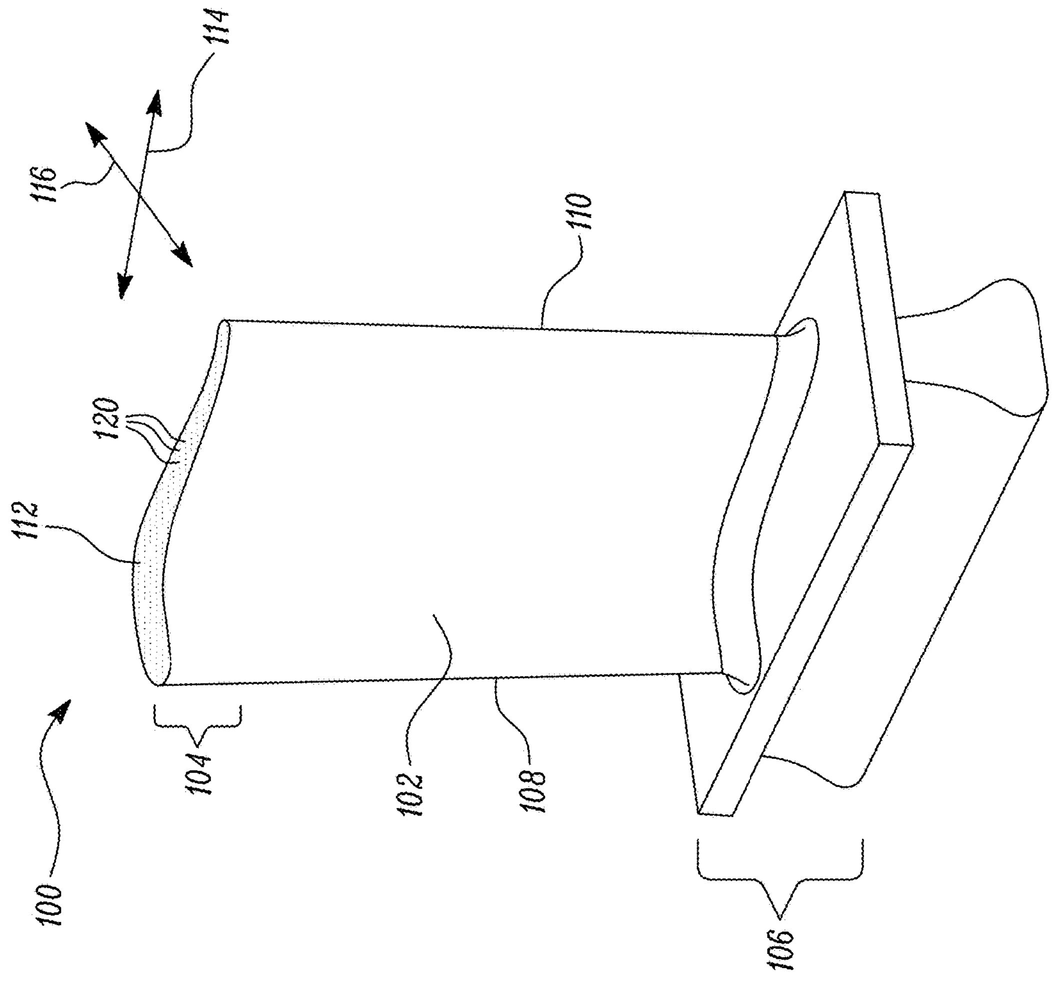
FIG. 2 is a schematic side view of an aerofoil structure in accordance with an embodiment of the present disclosure.

FIG. 2 shows a schematic side view of an aerofoil structure 100 for a gas turbine engine (for example, the gas turbine engine 10 of FIG. 1) in accordance with an embodiment of the present disclosure.

The aerofoil structure 100 includes an aerofoil portion 102. The aerofoil portion 102 includes a leading edge 108 and a trailing edge 110 opposite to the leading edge 108. The aerofoil portion 102 further includes a root portion 106 and a tip portion 104 opposite to the root portion 106. The aerofoil portion 102 may extend between the root portion 106 and the tip portion 104. The root portion 106 may be configured to be positioned in a slot of a disc of a rotor. For example, the root portion 106 may have a dovetail shape, a fir-tree shape, or other suitable geometry. The aerofoil portion 102 may be made from a metal, a carbon composite, a ceramic matrix composite or a combination thereof. In some embodiments, the tip portion 104 of the aerofoil portion 102 may be metallic or a single crystal superalloy, such as CMSX-4.

The tip portion 104 includes a tip surface 112. The tip surface 112 is configured to face a corresponding seal segment 50 (shown in FIG. 4) of the gas turbine engine.

The tip surface 112 defines a longitudinal axis 114 along a length of the tip surface 112 and a transverse axis 116 perpendicular to the longitudinal axis 114. The tip portion 104 further includes a plurality of cutting features 120 (schematically depicted in FIG. 2 by dot hatching). The plurality of cutting features 120 is provided on at least a portion of the tip surface 112. The plurality of cutting features 120 will be described in greater detail below with reference to the following figures.

Figure 3:
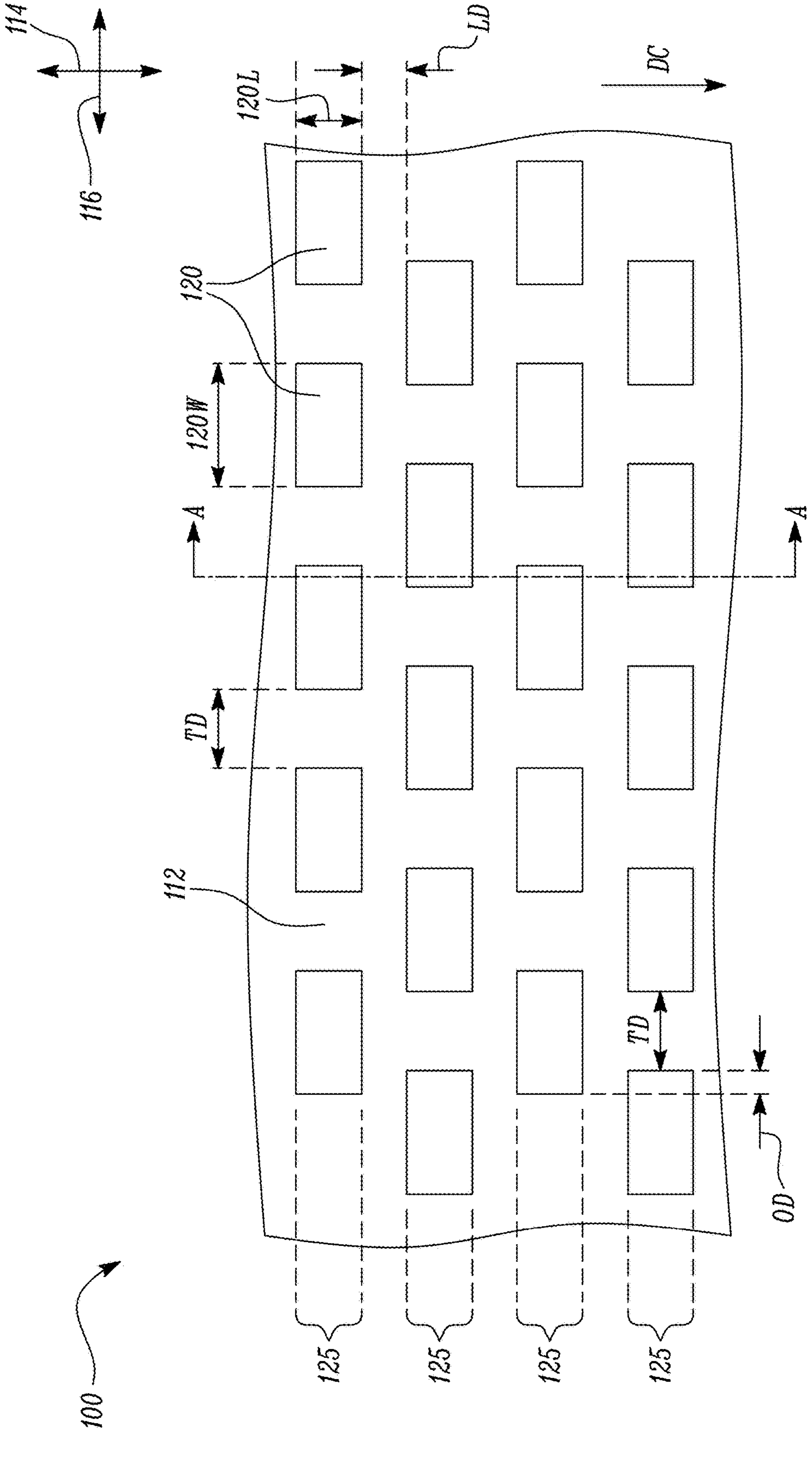
FIG. 3 is a schematic top view of a portion of the aerofoil structure in accordance with an embodiment of the present disclosure.
Figure 4:
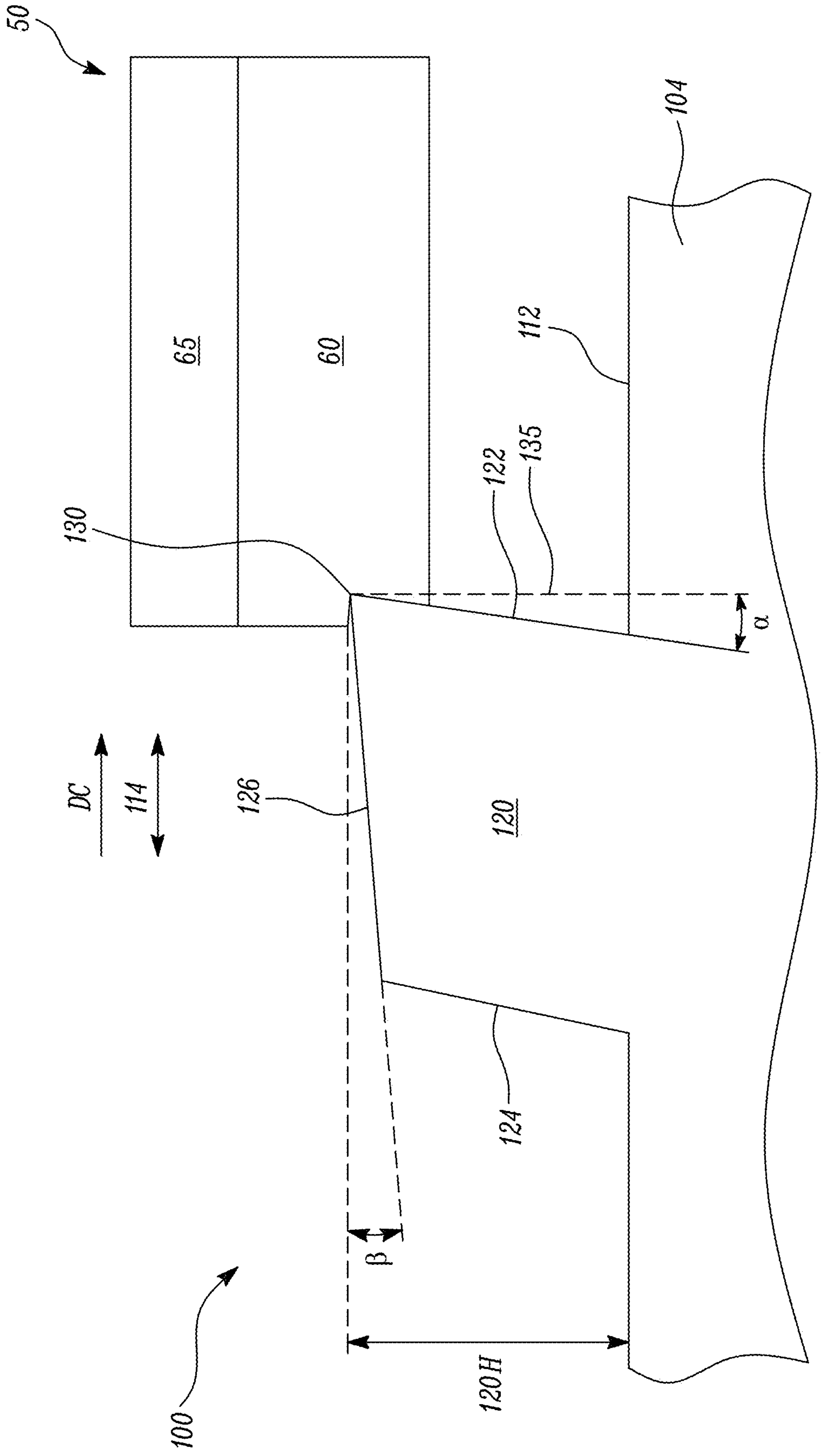
FIG. 4 is a schematic cross-sectional view of a portion of the aerofoil structure taken along a line A-A of FIG. 3 in accordance with an embodiment of the present disclosure.

FIG. 3 shows a schematic top view of a portion of the aerofoil structure 100 in accordance with an embodiment of the present disclosure. FIG. 4 shows a schematic cross-sectional view of a portion of the aerofoil structure 100 taken along a line A-A of FIG. 3 in accordance with an embodiment of the present disclosure. The seal segment 50 is also schematically depicted in FIG. 4.

As shown in FIG. 4, the seal segment 50 may include a substrate 65 and an abradable coating 60 applied to the substrate 65. The substrate 65 may be made from a metal. Further, the abradable coating 60 may have any suitable composition. For example, the abradable coating 60 may include a magnesium spinel coating system, Zirconia-based ceramics, ytterbium disilicate ($Yb_2Si_2O_3$), and the like. The abradable coating 60 may be applied to the substrate 65 by any suitable method or technique. The abradable coating 60 may face the tip surface 112 of the aerofoil structure 100.

Referring now to FIG. 3 and FIG. 4, the cutting features 120 are discrete and spaced apart from each other. Each cutting feature 120 from the plurality of cutting features 120 extends from the tip surface 112 and is configured to cut into the seal segment 50 in a cutting direction DC parallel to the longitudinal axis 114 upon rotation of the aerofoil structure 100 relative to the seal segment 50. Specifically, in some embodiments, each cutting feature 120 of the aerofoil structure 100 is configured to cut the abradable coating 60. Consequently, the plurality of cutting features 120 may cut or scrape the seal segment 50 resulting in removal of a material of the seal segment 50. The material of the seal segment 50 removed by the cutting or scraping by the plurality of cutting features 120 may be referred to as "chips". In some embodiments, the chips may be of the abradable coating 60.

A minimum longitudinal distance LD between a pair of adjacent cutting features 120 from the plurality of cutting features 120 along the longitudinal axis 114 is at least 100 microns. The minimum longitudinal distance LD of at least 100 microns may facilitate a movement of the chips across the plurality of cutting features 120 along the longitudinal axis 114, thereby improving a cutting efficiency of the plurality of cutting features 120. Moreover, the minimum longitudinal distance LD of at least 100 microns may reduce or prevent clogging of the chips between the plurality of cutting features 120. In some embodiments, the minimum longitudinal distance LD may be from 100 microns to 200 microns.

Further, in some embodiments, a minimum transverse distance TD between a pair of adjacent cutting features 120 from the plurality of cutting features 120 along the transverse axis 116 may be from 80 microns to 280 microns. The minimum transverse distance TD of from 80 microns to 280 microns may further facilitate the movement of the chips across the plurality of cutting features 120 along the longitudinal axis 114.

Moreover, the minimum transverse distance TD of from 80 microns to 280 microns may further reduce or prevent clogging of the chips between the plurality of cutting features 120. This may further improve the cutting efficiency of the plurality of cutting features 120.

Each cutting feature 120 may define a maximum width 120W along the transverse axis 116. In some embodiments, the maximum width 120W may be from 100 microns to 300 microns. The maximum width 120W of from 100 microns to 300 microns may provide optimal contact between each of the plurality cutting features 120 and the seal segment 50, or more specifically, the abradable coating 60. More specifically, the maximum width 120W of from 100 microns to 300 microns may provide optimal cutting performance while reducing cutting friction. This may further improve the cutting efficiency of the plurality of cutting features 120.

Each cutting feature 120 may further define a maximum length 120L along the longitudinal axis 114. In some embodiments, the maximum length 120L may be from 100 microns to 200 microns. The maximum length 120L of from 100 microns to 200 microns may ensure a mechanical integrity of the plurality of cutting features 120 during cutting of the seal segment 50, or more specifically, the abradable coating 60. Consequently, the aerofoil structure 100 may have a long operational life.

Further, a pair of adjacent cutting features 120 from the plurality of cutting features 120 that are spaced apart from each other along the longitudinal axis 114 may define a minimum overlap OD between them along the transverse axis 116. In some embodiments, the minimum overlap OD may be at least 10 microns. The minimum overlap OD of at least 10 microns may ensure that the plurality of cutting features 120 uniformly cuts the seal segment 50, or more specifically, the abradable coating 60 in the presence of the minimum transverse distance TD between the pair of adjacent cutting features 120.

In some embodiments, the plurality of cutting features 120 may be arranged in a plurality of rows 125 extending along the transverse axis 116 and spaced apart from each other along the longitudinal axis 114. In the illustrated embodiment of FIG. 3, each of the plurality of rows 125 is linearly arranged along the transverse axis 116. In some other embodiments, each of the plurality of rows 125 may be obliquely inclined to the transverse axis 116. In some other embodiments, each of the plurality of rows 125 may be arranged in a curved manner along the transverse axis 116. In some embodiments, adjacent rows 125 from the plurality of rows 125 may be staggered from each other along the transverse axis 116. The staggered configuration of the plurality of rows 125 may allow the plurality of cutting features 120 to be arranged with the minimum transverse distance TD and the minimum overlap OD.

Referring now to FIG. 4, each cutting feature 120 may include a leading surface 122, a trailing surface 124, and a top surface 126. The leading surface 122 extends from the tip surface 112. The trailing surface 124 is spaced apart from the leading surface 122 along the longitudinal axis 114 and extends from the tip surface 112. The top surface 126 is spaced apart from the tip surface 112 and extends between the leading surface 122 and the trailing surface 124. The leading surface 122 and the top surface 126 intersect at a cutting tip 130 that is configured to first cut the seal segment 50 in the cutting direction DC. The cutting tip 130 may first cut the abradable coating 60 of the seal segment 50.

Each cutting feature 120 may define a maximum height 120H from and perpendicular to the tip surface 112. In some embodiments, the maximum height 120H may be from 75 microns to 250 microns. The maximum height 120H of from 75 microns to 250 microns may reduce or prevent damage to the cutting feature 120 when the cutting tip 130 engages the seal segment 50, or more specifically, the abradable coating 60. In some embodiments, at least two cutting features 120 from the plurality of cutting features 120 may have different maximum heights 120H from the tip surface 112.

In some embodiments, a rake angle $\alpha$ between the leading surface 122 and a normal axis 135 perpendicular to the tip surface 112 may be from 90 degrees to −50 degrees. The rake angle $\alpha$ may be a positive angle (as shown in FIG. 4) or a negative angle (shown in FIG. 5) depending on application requirements. Further, in some embodiments, a relief angle $\beta$ between the top surface 126 and the longitudinal axis 114 may be from 10 degrees to 30 degrees. The relief angle $\beta$ of from 10 degrees to 30 degree may improve the cutting efficiency of the plurality of cutting features 120. The rake and relief angles $\alpha$, $\beta$ may be selected based on desired cutting speeds and a composition of the abradable coating 60.

It may be noted that the size, geometry, distribution, protrusion, spacing, cutting direction and/or orientation of the plurality of cutting features 120 may vary depending on the application. Further, the plurality of cutting features 120 may include a metal or metal alloy, such as CMSX-4. Therefore, the plurality of cutting features 120 may be much stronger at high temperatures than abrasive coatings (e.g., CoNiCrAIY) of conventional aerofoil structures.

In some embodiments, a method of manufacturing the aerofoil structure 100 may include forming the plurality of cutting features 120 on the tip surface 112 by at least one of: electrical discharge machining (EDM), electro chemical machining (ECM), machining, milling, stamping, casting, mechanical blasting, chemical etching, and laser ablation. The aforementioned method may provide a high level of precision and uniformity needed to form the plurality of cutting features 120, which may not be possible using conventional electroplating processes.

Figure 5:
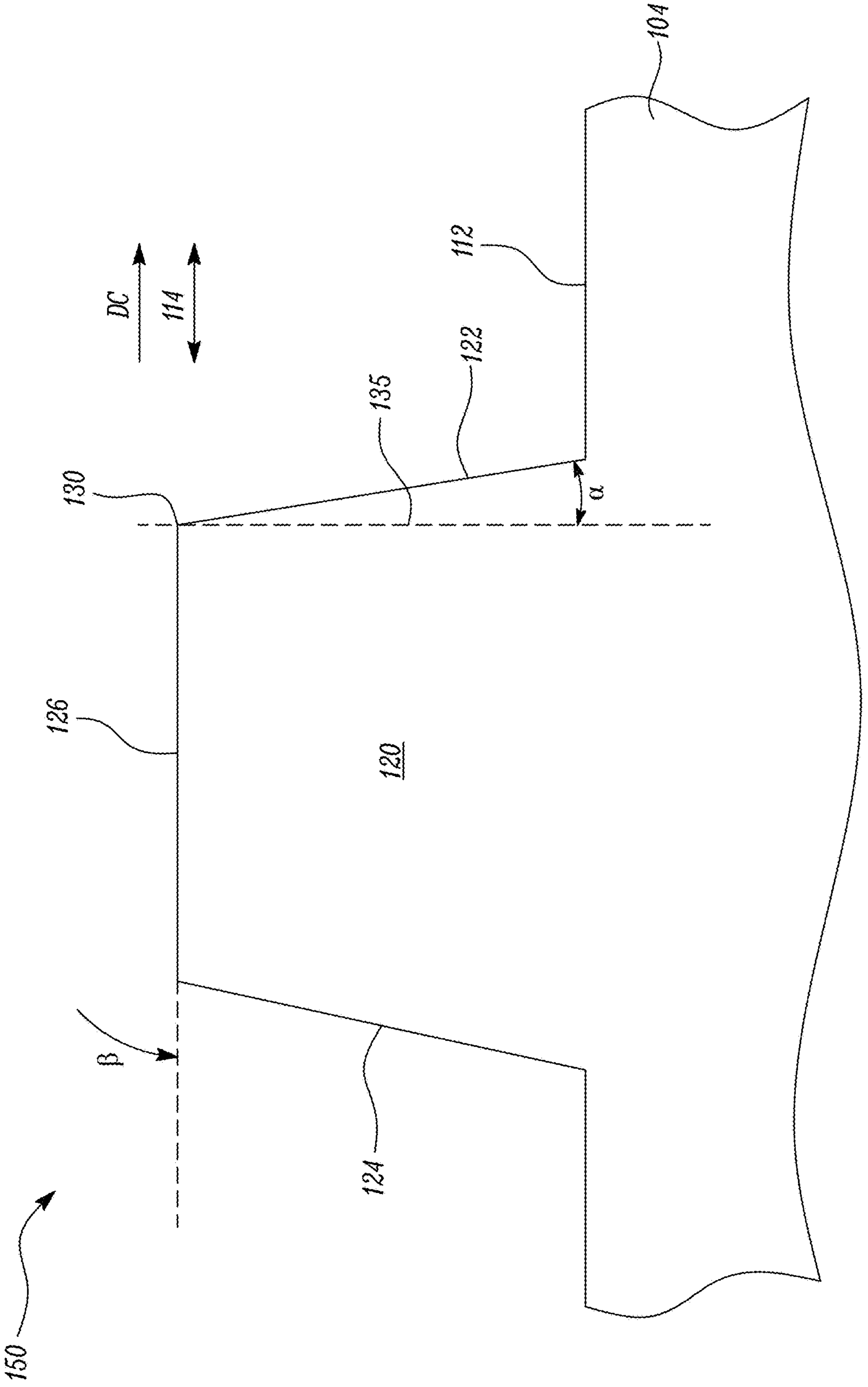
FIG. 5 is a schematic cross-sectional view of a portion of an aerofoil structure in accordance with another embodiment of the present disclosure.

FIG. 5 shows a schematic cross-sectional view of a portion of an aerofoil structure 150 in accordance with another embodiment of the present disclosure. The aerofoil structure 150 is substantially similar to the aerofoil structure 100 of FIG. 3, with like elements designated by like reference characters. However, the aerofoil structure 150 has a different configuration of the cutting feature 120 as compared to the aerofoil structure 100. Specifically, in the illustrated embodiment of FIG. 5, the rake angle $\alpha$ of the cutting feature 120 is negative. Further, the top surface 126 of the cutting feature 120 is parallel to the longitudinal axis 114, such that the relief angle $\beta$ of the cutting feature is 0 degrees.

Figure 6:
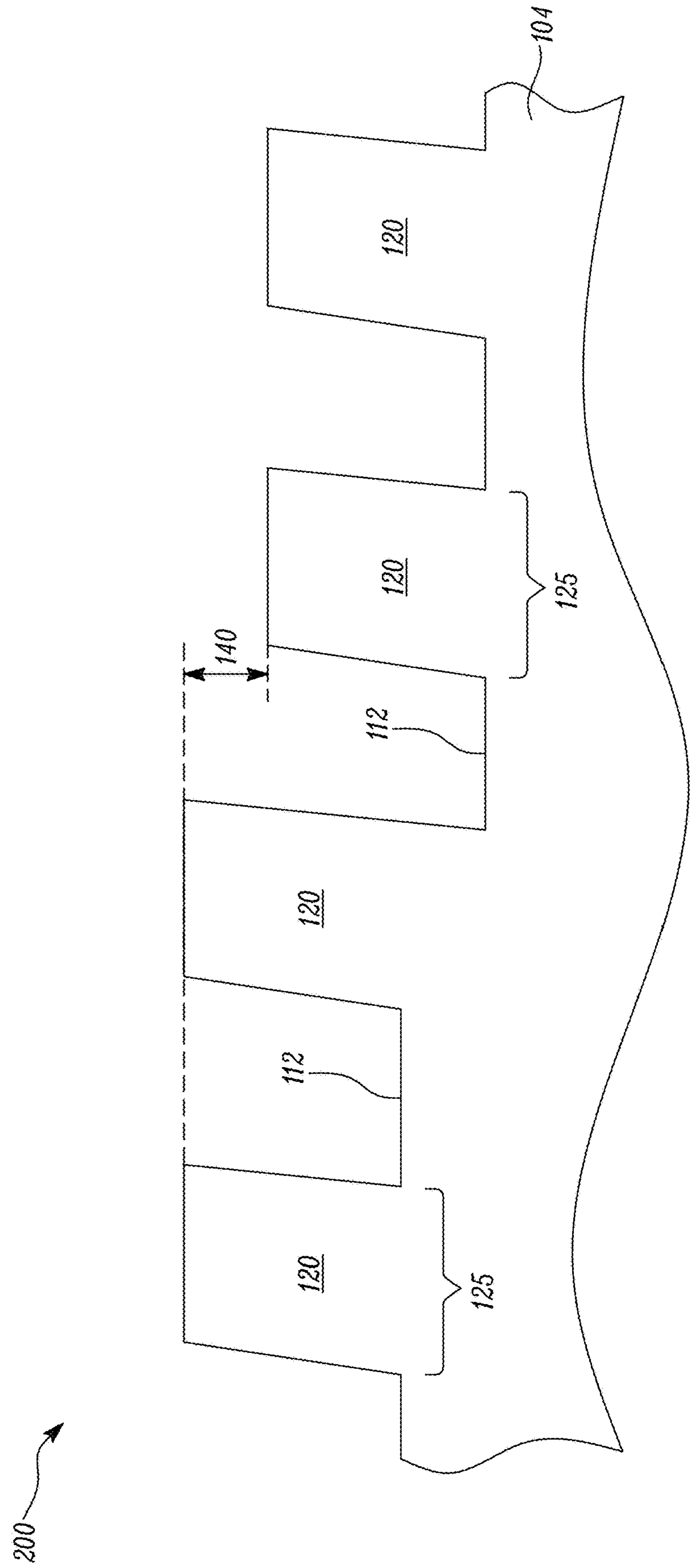
FIG. 6 is a schematic cross-sectional view of a portion of an aerofoil structure in accordance with another embodiment of the present disclosure.

FIG. 6 shows a schematic cross-sectional view of a portion of an aerofoil structure 200 in accordance with another embodiment of the present disclosure. The aerofoil structure 200 is substantially similar to the aerofoil structure 100 of FIG. 3, with like elements designated by like reference characters. However, the aerofoil structure 200 has a different configuration of the plurality of cutting features 120 as compared to the aerofoil structure 100.

In the illustrated embodiment of FIG. 6, the cutting features 120 of at least two rows 125 from the plurality of rows 125 are vertically offset from each other along the normal axis 135 perpendicular to the tip surface 112. Specifically, the cutting features 120 of the at least two rows 125 may define a vertical offset 140 therebetween. The vertical offset 140 may be provided by varying the tip surface 112. The vertical offset 140 may ensure that the plurality of cutting features 120 provide a more progressive cutting action as taller cutting features 120 may first cut the seal segment 50, and the lower cutting features 120 may not cut the seal segment 50 unless a higher degree of impact with the seal segment 50 occurs.

Figure 7A:
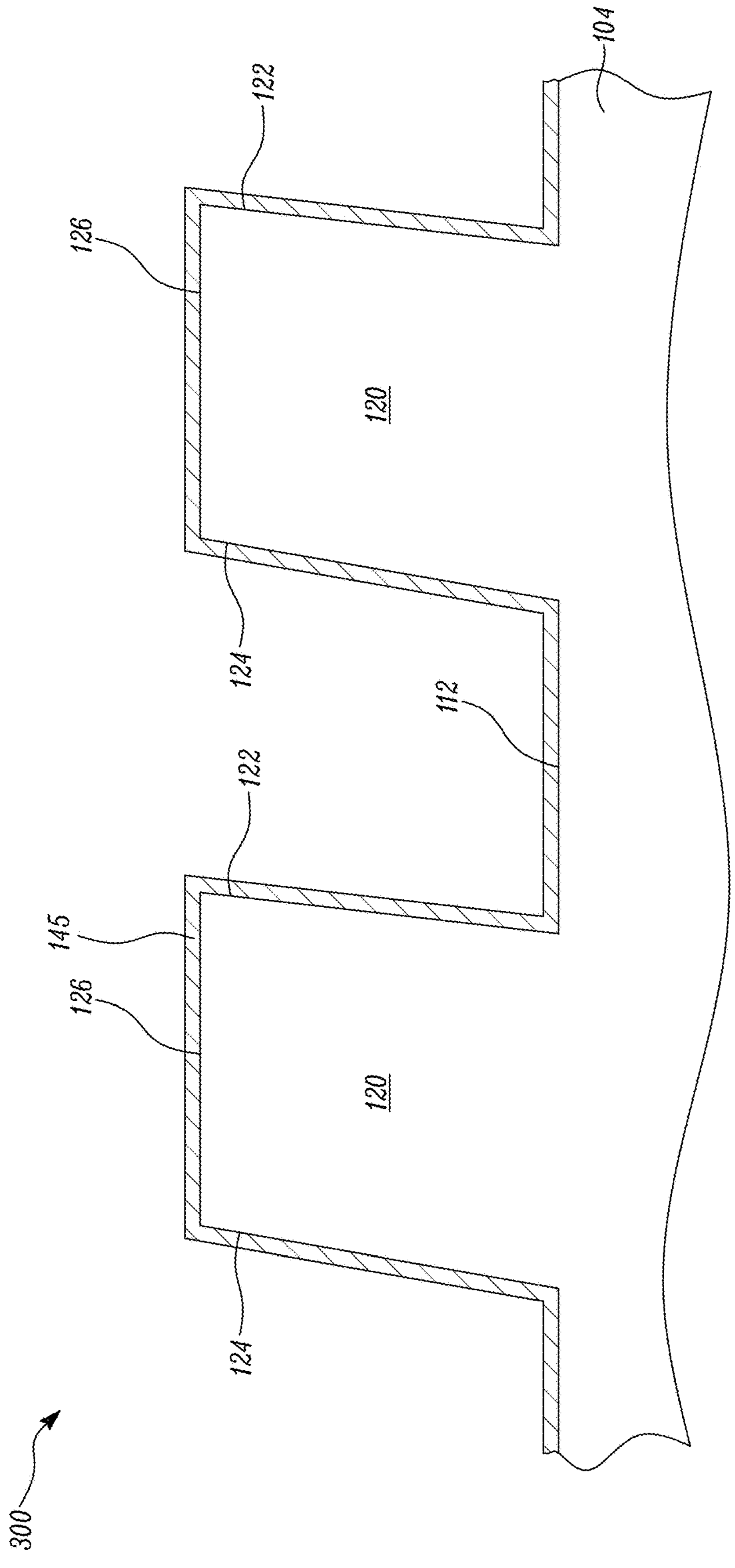
FIG. 7A is a schematic cross-sectional view of a portion of an aerofoil structure in accordance with another embodiment of the present disclosure.

FIG. 7A shows a schematic cross-sectional view of a portion of an aerofoil structure 300 in accordance with another embodiment of the present disclosure.

Figure 7B:
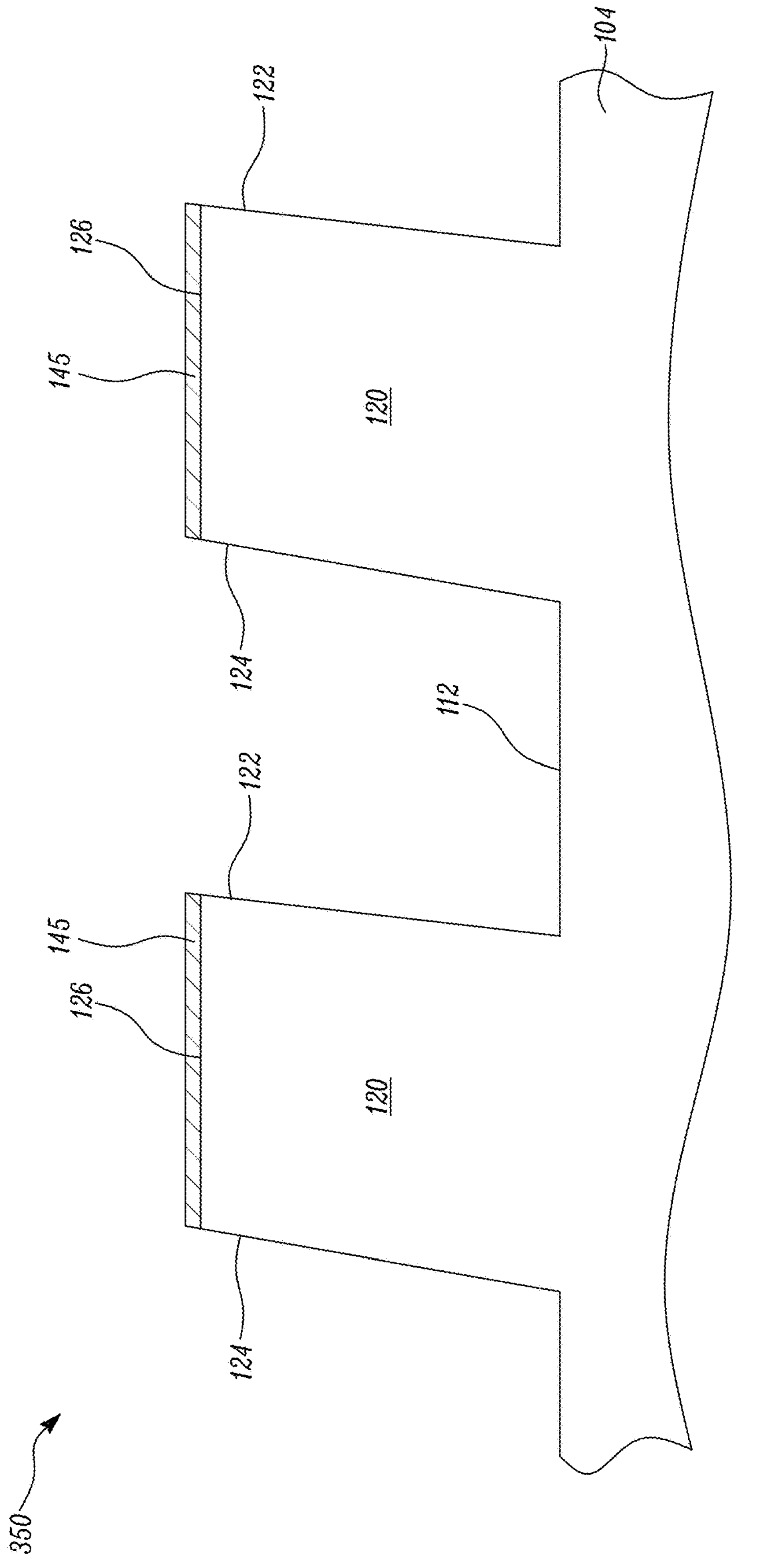
FIG. 7B is a schematic cross-sectional view of a portion of an aerofoil structure in accordance with another embodiment of the present disclosure.

Further, FIG. 7B shows a schematic cross-sectional view of a portion of an aerofoil structure 350 in accordance with another embodiment of the present disclosure.

Each of the aerofoil structures 300, 350 is similar to the aerofoil structure 100 of FIG. 3, with like elements designated by like reference characters. However, each of the aerofoil structures 300, 350 includes a coating 145 disposed on the plurality of cutting features 120.

Referring first to FIG. 7A, in this embodiment, the coating 145 is applied on the plurality of cutting features 120 after forming the plurality of cutting features 120, for example, by machining the tip portion 104. Consequently, the coating 145 may be at least partially disposed on the leading surface 122, the trailing surface 124, and the top surface 126 of each of the plurality of cutting features 120. Further, the coating 145 may be at least partially disposed on the tip surface 112.

Referring now to FIG. 7B, in this embodiment, the coating 145 is applied to the aerofoil structure 350 before forming the plurality of cutting features 120, for example, by machining the tip portion 104. Specifically, the coating 145 is applied to the aerofoil structure 350 before machining of the aerofoil structure 350 to provide the aerofoil structure 350 with the plurality of cutting features 120. Consequently, the coating 145 may be at least partially disposed on the top surface 126 of each of the plurality of cutting features 120. That is, the coating 145 may be absent on the tip surface 112, the leading surface 122, and the trailing surface 124, which are formed after machining of the aerofoil structure 350. However, it may be noted that the absence of the coating 145 on the tip surface 112, the leading surface 122, and the trailing surface 124 may not detrimentally affect the cutting performance of the plurality of cutting features 120.

The coating 145 may be applied before provision of the plurality of cutting features 120 or after provision of the plurality of cutting features 120. The coating 145 may have a thickness of between 2 microns and 100 microns. Application of the coating 145 on the plurality of cutting features 120 may be less expensive and less time consuming than conventional approaches, such as application of an abrasive powder, which may require laying down of multiple preparatory layers before the abrasive powder can be deposited.

In some embodiments, the coating 145 may include a material having a higher hardness than a material of each cutting feature 120. In such embodiments, the coating 145 may be a wear resistant coating. Materials having higher hardness, for example, titanium nitride or chromium nitride may improve the cutting performance of the plurality of cutting features 120. In some examples, the coating 145 may include a surface intermetallic, such as $\beta$-NiAl (nickel aluminide), $\beta$-(Ni, Pt)Al, $PtAl_2$ or a mixed phase, such as $\beta$-(Ni, Pt)Al+$PtAl_2$ formed by aluminising or platinum aluminising. The aforementioned surface intermetallics may be optionally oxidised afterwards to form a hard dense alpha alumina ($\alpha$-$Al_2O_3$) scale.

In some embodiments, the coating 145 may be a high temperature resistant coating. The high temperature resistant coating may include, for example, silicon nitride, silicon carbide, cubic boron nitride, or a hard oxide coating such as partly or fully stabilised zirconia. Materials having high entropy, for example, but not limited to, high entropy nitrides, such as (HfNbTiTaZr)N, (AlCrTaTiZr)N, (AlCrMoTaTiSi)N, (AlCrNbSiTiV)N and (AlCrSiNbZr)N, high entropy borides, such as $(HfMo,Ta,NbTi)B_2$ and $(HfZrMoNbTi)B_2$, high entropy carbides, such as (TiZrNbHfTa) and (TaNbSiZrCr) carbides, may also be used.

Various techniques may be used to apply the coating 145 to the plurality of cutting features 120, such as physical vapour deposition (e.g., reactive sputtering, chemical vapour deposition or thermal spray). In some embodiments, the coating 145 may include a high strength material, such as $\beta$NiAl+Laves phases, and may be applied using techniques such as Direct Laser Deposition.

Advantageously, the plurality of cutting features 120 may be re-provided to an aerofoil structure (e.g., the aerofoil structures 100, 150, 200, 300, 350) after the aerofoil structure is restored to its desired height in an overhaul repair. Moreover, a thicker layer of the coating 145 may be applied to the aerofoil structure to restore the aerofoil structure to its desired height.

Referring now to FIG. 1 to FIG. 7B, in some embodiments, the gas turbine engine 10 may include the aerofoil structure 100, 150, 200, 300, 350. In some embodiments, a turbine blade of the gas turbine engine 10 may include the aerofoil structure 100, 150, 200, 300, 350. In some embodiments, the gas turbine engine 10 may include a rotor disc (not shown) including a plurality of the aerofoil structures 100, 150, 200, 300, 350 circumferentially spaced apart from each other about the rotational axis 9 of the gas turbine engine 10. The aerofoil structure 100, 150, 200, 300, 350 may be part of the high pressure turbine 17 and/or the low pressure turbine 19 of the gas turbine engine 10.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An aerofoil structure for a gas turbine engine, the aerofoil structure comprising:

an aerofoil portion and a tip portion, the tip portion comprising a tip surface configured to face a corresponding seal segment of the gas turbine engine and a plurality of cutting features provided on at least a portion of the tip surface, wherein the cutting features are discrete and spaced apart from each other, the tip surface defining a longitudinal axis along a length of the tip surface and a transverse axis perpendicular to the longitudinal axis, each cutting feature from the plurality of cutting features extending from the tip surface and being configured to cut into the seal segment in a cutting direction parallel to the longitudinal axis upon rotation of the aerofoil structure relative to the seal segment, wherein a minimum longitudinal distance between a pair of adjacent cutting features from the plurality of cutting features along the longitudinal axis is at least 100 microns, wherein each cutting feature defines a maximum height from and perpendicular to the tip surface, and wherein the maximum height is from 75 microns to 250 microns, and wherein at least two cutting features from the plurality of cutting features have different maximum heights from the tip surface.

2. The aerofoil structure of claim 1, wherein the minimum longitudinal distance is from 100 microns to 200 microns.

3. The aerofoil structure of claim 1, wherein a minimum transverse distance between a pair of adjacent cutting features from the plurality of cutting features along the transverse axis is from 80 microns to 280 microns.

4. The aerofoil structure of claim 1, wherein a pair of adjacent cutting features from the plurality of cutting features that are spaced apart from each other along the longitudinal axis define a minimum overlap between them along the transverse axis, and wherein the minimum overlap is at least 10 microns.

5. The aerofoil structure of claim 1, wherein each cutting feature defines a maximum width along the transverse axis, and wherein the maximum width is from 100 microns to 300 microns.

6. The aerofoil structure of claim 1, wherein each cutting feature defines a maximum length along the longitudinal axis, and wherein the maximum length is from 100 microns to 200 microns.

7. The aerofoil structure of claim 1, wherein each cutting feature comprises a leading surface extending from the tip surface, a trailing surface spaced apart from the leading surface along the longitudinal axis and extending from the tip surface, and a top surface spaced apart from the tip surface and extending between the leading surface and the trailing surface, the leading surface and the top surface intersecting at a cutting tip that is configured to first cut the seal segment in the cutting direction.

8. The aerofoil structure of claim 7, wherein a rake angle between the leading surface and a normal axis perpendicular to the tip surface is from 90 degrees to −50 degrees.

9. The aerofoil structure of claim 7, wherein a relief angle between the top surface and the longitudinal axis is from 10 degrees to 30 degrees.

10. The aerofoil structure of claim 1, wherein the plurality of cutting features is arranged in a plurality of rows extending along the transverse axis and spaced apart from each other along the longitudinal axis.

11. The aerofoil structure of claim 10, wherein adjacent rows from the plurality of rows are staggered from each other along the transverse axis.

12. The aerofoil structure of claim 11, wherein the cutting features of at least two rows from the plurality of rows are vertically offset from each other along a normal axis perpendicular to the tip surface.

13. The aerofoil structure of claim 1, wherein the aerofoil structure further comprises a coating disposed on the plurality of cutting features.

14. The aerofoil structure of claim 13, wherein the coating comprises a material having a higher hardness than a material of each cutting feature.

15. A method of manufacturing the aerofoil structure of claim 1, the method comprising forming the plurality of cutting features on the tip surface by at least one of: electrical discharge machining, electro chemical machining, machining, milling, stamping, casting, mechanical blasting, chemical etching, and laser ablation.

16. A gas turbine engine including the aerofoil structure of claim 1.

17. The gas turbine engine of claim 16, further comprising a seal segment comprising an abradable coating facing the tip surface of the aerofoil structure, wherein each cutting feature of the aerofoil structure is configured to cut the abradable coating.

* * * * *